United States Patent [19]

Schraudolph et al.

[11] Patent Number: 4,769,751
[45] Date of Patent: Sep. 6, 1988

[54] CONTROL METHOD FOR AN EXTRA HIGH VOLTAGE D-C TRANSMISSION CONNECTING TWO THREE-PHASE NETWORKS

[75] Inventors: Manfred Schraudolph, Erlangen; Christa Storner, Grossenseebach, both of Fed. Rep. of Germany

[73] Assignee: Siemens Aktiengesellschaft, Munich, Fed. Rep. of Germany

[21] Appl. No.: 899,931

[22] Filed: Aug. 25, 1986

[30] Foreign Application Priority Data

Aug. 26, 1985 [DE] Fed. Rep. of Germany ....... 3530422
Jul. 16, 1986 [EP] European Pat. Off. ......... 86109776.4

[51] Int. Cl.$^4$ ............................................... H02J 3/36
[52] U.S. Cl. ........................................ 363/35; 323/209
[58] Field of Search ........................... 363/35, 37, 51; 323/208, 209, 210

[56] References Cited

U.S. PATENT DOCUMENTS

| 4,250,542 | 2/1981 | Bulakhov et al. | 363/35 |
| 4,263,517 | 4/1981 | Konishi | 363/35 X |
| 4,279,009 | 7/1981 | Andronov et al. | 363/35 |
| 4,648,018 | 3/1987 | Neupauer | 363/35 |
| 4,649,466 | 3/1987 | Rogowsky | 363/35 |

Primary Examiner—Patrick R. Salce
Assistant Examiner—Kristine Peckman
Attorney, Agent, or Firm—Kenyon & Kenyon

[57] ABSTRACT

Simultaneous power and voltage control by a d-c-tie between a-c networks is carried out by means of fixed and switchable inductive and capacitive compensation elements including the tap changer of both converter transformers of a d-c-tie for setting the optimum operating point by a transformation ratio of the converter transformer taps matching the primary current ratio, of the converter transformer taps for the maximally permissible stage of the one converter transformer, taking into consideration control, extinction and overlap angles of the d-c-tie.

5 Claims, 2 Drawing Sheets

CONTROL METHOD FOR AN EXTRA HIGH VOLTAGE D-C TRANSMISSION CONNECTING TWO THREE-PHASE NETWORKS

BACKGROUND OF THE INVENTION

The present invention relates to a combined control method for a d-c-tie connecting two independent three-phase a-c networks.

In known control methods for a d-c-tie, the active power of the system is controlled and the reactive power is adapted to the reactive power demand of the respective a-c network with the aid of shunt reactors or capacitors, static compensators (for instance, thyristor-controlled reactors or capacitors) and/or synchronous condensors. For the controlled compensation devices for both a-c networks, a considerable amount of means is required for a necessary fine-step or stepless voltage adaptation to the active power to be transmitted. In addition, it is possible to switch the tap changer of the converter transformer in the wrong direction before the control arrangement can ascertain that compensating devices must be switched, so that the tap position must be switched back in the direction of its starting position after the respective compensation device has been switched by it independently; switching beyond its starting position may even become necessary. The control process with successive switching actions of the tap changer allows only a slow control; the required active and reactive power cannot be maintained during switching operations which take a relatively long time. In addition, the tap changer is stressed unnecessarily by the back and forth stepping operations.

In order not be extend the control time further, only the side of the d-c-tie connected to the weaker a-c network is frequently controlled in the sense of meeting the predetermined reactive power conditions of this a-c network, and the other side of the d-c-tie associated with the stronger a-c network is made to approach, as far as reactive power is concerned, the demand only via switchable shunt reactors or capacitors as compensating elements, so that in the second a-c network, the reactive power required there cannot be maintained exactly. This method further cannot recognize a control into undesirable boundary regions so that in the event of changes of the desired power or in the case of voltage changes in the a-c networks, no sufficient control reserve is provided. If in the case of two weak a-c networks an exact control is required also on the side of the second a-c network a further slowing-down of the control is resulted.

SUMMARY OF THE INVENTION

It is an object of the present invention to provide a substantially faster control for both a-c sides of the d-c-tie and to determine an operating point which makes it possible to maintain the predetermined reactive power condition for both a-c networks and which, in the case of dynamic processes related to changes, of active power in the d-c-tie allows the fast determination of a new operating point which allows on both a-c sides of the d-c-tie the smallest possible deviations from the respective set-point values of the a-c network voltages and reactive power of the a-c networks, where switchable shunt reactors or capacitors suffice.

The above and other objects of the present invention are achieved by a control method for a d-c-tie (high-voltage transmission system) connecting two a-c networks with active power control and combined reactive-power influencing by shunt reactors or shunt capacitors and converter transformers with tap changers for maintaining the voltage of the a-c networks. Simultaneous active and reactive power control of both a-c networks is performed by combinations of fixed and switchable shunt capacitors and/or shunt reactors, including the tap position of both converter transformers for setting the optimum operating point at the maximally permissible tap position for the respective operating voltage of the one converter transformer, wherein the ratio of the primary currents of the two converter transformers and the ratio of the maximally permissible tap position of the one converter transformer to a fitting tap position of the other converter transformer is chosen in accordance with the relationship $$\frac{u_2}{u_1} = \frac{S_{iV2}}{S_{iV1}} \cdot \sqrt{\frac{\rho_1^2 + \chi_1^2}{\rho_2^2 + \chi_2^2}}$$

taking into consideration the dependence of the prevailing d-c current $$I_d = \frac{S_{IV}}{\frac{3b}{\pi} \sqrt{\frac{2}{3}} u \cdot \sqrt{\rho^2 + \chi^2}}$$

in the direction of obtaining a permissible transmission current $I_{dmin}$ meeting all network requirements, equal to one-half of the sum of the d-c currents of the two converters, wherein $ü_1$, $ü_2$ are the transformation ratios of the respective tap position; $S_{iV1}$, $S_{iV2}$ are the a-c side currents of the converter transformers; b is the number of the series-connected rectifier bridges; $\rho_1$, $\rho_2$, $\chi_2$, $\chi_1$ are variables dependent on control angles $\alpha$, extinction angles $\gamma$, and overlap angles u in accordance with the following equations:

$$\epsilon = \tfrac{1}{2}[\cos\alpha - \cos(\alpha + u)]$$

$$\rho = \tfrac{1}{2}[\cos\alpha + \cos(\alpha + u)]$$

$$\chi = \tfrac{1}{2}[\sin\alpha + \sin(\alpha + u)] + \frac{u\frac{\pi}{180} - \sin u}{4\epsilon}.$$

The control method according to the invention starts out from the reactive-power demand of both a-c networks, the a-c network voltage required in each case as well as the required transmission power of the d-c-tie system, while these values are adapted to the actual network conditions. From the permissible voltage range and the fixed and switchable shunt reactors or capacitors provided as well as the converter transformer tap positions and the required voltage-dependent reactive power of each a-c network, a region is obtained in a reactive power, active power diagram for operating of the converters, within which operating points are determined in steady-stage operation which meet all a-c network conditions. Adding and disconnecting capacitive or inductive compensation elements takes place if the range is exceeded or not reached. In the case of dynamic processes, the operating point may lie outside of the mentioned range.

For supporting a a-c network, the d-c current can be adjusted as the transmission current determined for the side of the d-c-tie assigned to this a-c network. The reactive power of the other a-c network then deviates from the set value accordingly more.

If the compensation elements are designed sufficiently large, the reactive power of one or both converters are changed in the direction of an approximation by switching of shunt capacitors or reactors, the position of the transformer tap changer assigned to them exhibits the smallest possible difference. Finally, the tap positions for each converter transformer as well as the d-c currents of the converters are determined by the given network data and the operating data and preferably the smallest possible common d-c current is determined therefrom which is sufficient for meeting all conditions of both a-c networks.

After coarse adjustment by the compensation elements, the optimum operating point is advantageously determined by addressing the combination of the tap position determined in accordance with the method of the invention, so that fine tuning by a static compensator or a synchronous condenser is not necessary.

The method of the invention makes possible (a) a targeted addressing of an unambiguous operating point which meets all network requirements, (b) the statement of missing or not required compensating elements in case of structural changes of the a-c networks with changes of the reactive power required by them, (c) the determination of another favorable operating point in the event of a failure or disconnecting of compensating elements for servicing purposes, as well as (d) the adjustment of the most favorable operating point during occurring power or voltage changes (dynamic processes) during the time interval in which no compensation elements and no tap changer can yet operate.

BRIEF DESCRIPTION OF THE DRAWINGS

Further details will be explained with the aid of an example for a d-c-tie operating in accordance with the control method of the invention, with reference to the drawings, in which.

DETAILED DESCRIPTION

Figure 1:
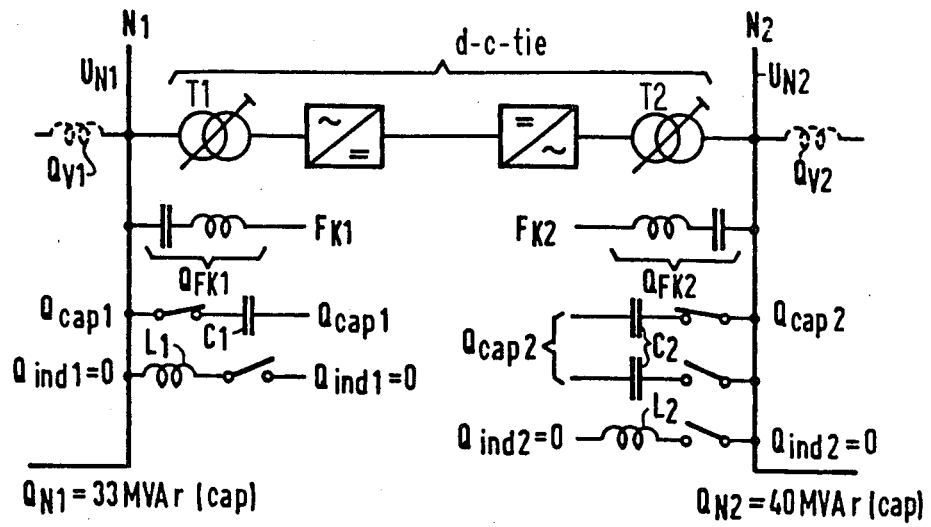
FIG. 1 shows a d-c-tie back to back coupling connecting two a-c networks schematically with fixed filter circuits and switchable compensation elements.
Figure 2:
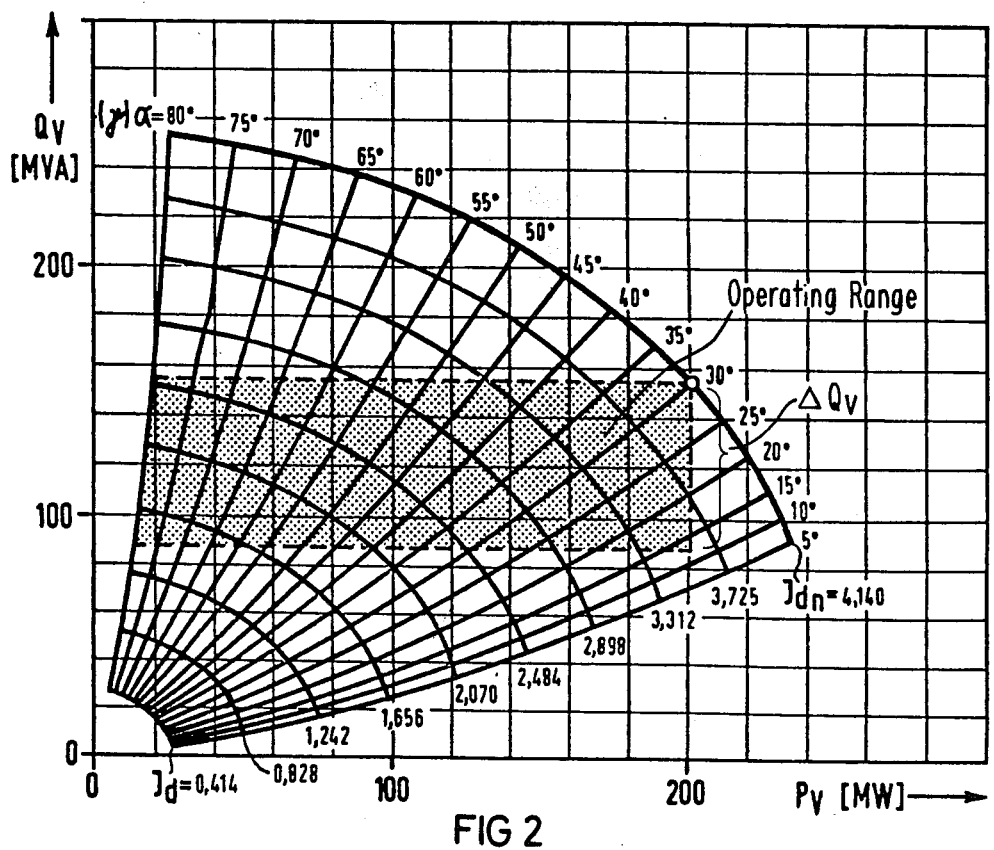
FIG. 2 shows an active-reactive power diagram for the d-c-tie with a range of value pairs in which the d-c-tie operates for meeting all operating conditions and specifically as a function of the control or the extinction angle and of the transmitted d-c current and of the transformer tap and a nominal voltage of 230 kV.

The operating data associated with the a-c networks N1 and N2 are designated with appropriate subscripts and furthermore with additional subscripts N and n, of which the subscript N indicates network variables and the subscript n indicates nominal values.

In the following description, the following designations are made:

$P_n$ = nominal active power $P_{ref}$ = desired active power
$U_N$ = network voltage ($U_{N1}$, $U_{N2}$, $U_{Nn}$)
$u_{Kn}$ = nominal shortcircuit voltage of the respective converter transformer
$I_d$ = converter d-c current ($I_{d1}$, $I_{d2}$)
$I_{dmin}$ = smallest d-c transmission current of the d-c-tie which meets the network conditions of both networks N1 and N2 as well as the active and reactive power requirements.
$Q_N$ = reactive power demand of the a-c network ($Q_{N1}$, $Q_{N2}$)
$Q_V$ = required reactive power of the converter ($Q_{V1}$, $Q_{V2}$)
$Q_{FK}$ = reactive power of filter circuit $\left.\begin{array}{c} Q_{cap} \\ Q_{ind} \end{array}\right\}$ = reactive power of shunt capacitors or reactors $\left.\begin{array}{c} C \\ L \end{array}\right\}$ = switchable compensation elements $S_{iV}$ = primary current of the converter transformer
$FK$ = filter circuit
$ü$ = transformation ratio of converter transformer
$\alpha$ = control angle of the rectifier side
$\gamma$ = extinction angle of the inverter side
$u$ = overlap angle $u = \arccos(\cos\alpha - u_{Kn}) = \alpha$
$\epsilon_1 = \frac{1}{2}[\cos\alpha = \cos(\alpha + u_1)]$; $\epsilon_2 = \frac{1}{2}[\cos\gamma - \cos(\gamma + u_2)]$
$\rho_1 = \frac{1}{2}[\cos\alpha + \cos(\alpha + u_1)]$; $\rho_2 = \frac{1}{2}[\cos\gamma + \cos(\gamma + u_2)]$ $$x_1 = \frac{1}{2}[\sin\alpha + \sin(\alpha + u_1)] + \frac{u_1 \frac{\pi}{180} - \sin u_1}{4\epsilon_1}$$

$$x_2 = \frac{1}{2}[(\sin\gamma + \sin(\gamma + u_2)] + \frac{u_2 \frac{\pi}{180} - \sin u_2}{4\epsilon_2}$$

For the example shown in the following of d-c-tie with nominal active power $P_n = 200$ MW, $P_{ref} = 20$ MW and a nominal network voltage $U_{Nn} = 230$ kV, the requirements for the a-c networks N1 and N2 given by the utility are as follows:

| | |
|---|---|
| $Q_{N1}$ | = 33 MVAr (capacitive) |
| $Q_{N2}$ | = 40 MVAr (capacitive) |
| $U_{N1}$ | = 241.5 kV corresponding to 241.5/230 = 1.05 per unit |
| $U_{N2}$ | = 234.6 kV corresponding to 234.6/230 = 1.02 per unit |

From this, the necessary compensation elements keeping in mind the filter circuits FK can be calculated with the values preferably intended for filtering harmonics:

$FK_1 \equiv Q_{FK1} = 105$ MVAr; in addition, a shunt capacitor $C_1 \equiv Q_{cap1} = 35$ MVAr $FK_2 \equiv Q_{FK2} = 105$ MVAr: additionally a shunt capacitor $C_2 \equiv Q_{cap2} = 35$ MVAr For this transmission in the range from full to partial loads, with the available compensation elements, the transformer data for the converter transformers as well as the voltage-dependent reactive power requirements of the a-c networks, there is determined an operating range of the converter reactive power between 90 and 155 MVAr, which assures reliable operation for all operating requirements and which has sufficient control reserves in both power flow directions for dynamic processes.

The following is obtained for:
Network N1

Reactive power demand $Q_{N1}=33.0$ MVAr (capacitive) for $U_{N1}=241.5$ kV; (1.05 p.u.)

Filter circuit $FK_1$ with $Q_{FK1}=105\times 1.05^2=115.76$ MVAr $C_1$ with $Q_{cap1}=35\times 1.05^2=38.59$ MVAr no shunt reactors required, i.e., $Q_{ind1}=0$ Network N2

Reactive power demand $Q_{N2}=40.0$ MVAr (capacitive) for $U_{N2}$ 234.6 kV; (1.02 p.u.)

Filter circuit $FK_2$ with $Q_{FK2}=105\times 1.02^2=109.24$ MVAr $C_2$ with $Q_{cap2}=35\times 1.02^2=36.41$ MVAr no shunt reactors necessary, i.e., $Q_{ind2}=0$ From this is obtained:

$$Q_{V1}=Q_{FK1}+Q_{N1}+Q_{cap1}-Q_{ind1}=115.76-33.0+38.59-0=121.35 \text{ MVAr}$$

$$Q_{V2}=Q_{FK2}+Q_{N2}+Q_{cap2}-Q_{ind2}=109.24-40.0+36.41-0=105.66 \text{ MVAr}$$

The calculated reactive power of the converters $Q_{V1}=121.35$ MVAr and $Q_{V2}=105.66$ MVAr are in the said operating range between 90 and 155 MVAr.

With the a-c network conditions given by the utility, the active power at the inverter and the required compensation elements for this example, the tap position for each converter transformer of the d-c-tie and the transmission current $I_{dmin}$ can be determined in the following manner from $$\text{power factor } \cos\phi = \cos\left[\arctan\frac{Q_v}{P_{ref}}\right] \quad (1)$$

$\phi$ is set equal to $\alpha$ and $\gamma$, respectively, in first approximation:

$$S_{iV} = \frac{Q_v}{\sqrt{3}\ U_N \sin\phi} \quad (2)$$

$$u = \arccos(\cos\alpha - u_{kn}) - \alpha \quad (3)$$

$$\epsilon = \tfrac{1}{2}[\cos\alpha - \cos(\alpha + u)] \quad (4)$$

$$\rho = \tfrac{1}{2}[\cos\alpha + \cos(\alpha + u)] \quad (5)$$

$$ = \tfrac{1}{2}[\sin\alpha + \sin(\alpha + u)] + \frac{u\frac{\pi}{180} - \sin u}{4\epsilon} \quad (6)$$

$$I_d = \frac{S_{iv}}{3/\pi \cdot b \sqrt{3/2}\ u \sqrt{\rho^2 +\ ^2}}$$

(with b=number of converter bridges connected in series).

If concrete values are substituted, the following is obtained:

$$\cos\rho_1 = 0.1626 \text{ and thus } \rho_1 = 80.64°$$
$$\rho_2 = 79.28°$$
$$S_{iv1} = 0.2940 \text{ kA and } S_{iv2} = 0.2646 \text{ kA}$$
$$u_1 = 9.20° \text{ and } u_2 = 9.23°$$
$$\epsilon_1 = 0.08 \text{ and } \epsilon_2 = 0.08$$
$$\rho_1 = 0.0835 \text{ and } \rho_2 = 0.1060$$
$$_1 = 0.9954 \text{ and } _2 = 0.9933$$

From the relationship according to the idea of the invention, $I_{d1}=I_{d2}$, the relationship of the transformation ratios $$u_2:u_1 = \frac{S_{iv2}}{S_{iV1}} \cdot \sqrt{\frac{\rho_1^2 +\ _1^2}{\rho_2^2 +\ _2^2}}$$

can be calculated as 0.9.

Accordingly, the transformation ratio $ü_2$ of the converter transformer associated with the a-c network N2 is 0.9-times as large as the transformation ratio $ü_1$ of the converter transformer associated with the network N1, and the possible tap combinations are fixed thereby.

In the numerical example, both converter transformers are equal and each have 35 taps. For calculating the smallest permissible d-c current $I_{dmin}$ it is assumed that one of the two converter transformers is always set to the highest tap permissible for this a-c network voltage, in the case of the tap 35 of the converter transformer T1 of the a-c network N1, since $ü_2$ is smaller than $ü_1$.

At the converter transformer T2 associated with the a-c network N2, the tap coming closest to the calculated value $ü_2=ü_{1(35)}\times 0.9$ is set.

For an actual value $ü_{1(35)}=0.110444$, a numerical value of $ü_2=0.09939$ is obtained.

This is approached closest by the tap 28 of the second converter transformer T2 with $ü_{2(28)}=0.09924$.

The d-c current for the 35th and 28th tap calculated therefrom is obtained as $$I_{d1} = \frac{0.2940}{1.559 \cdot 0.11044 \sqrt{0.0835^2 + 0.9954^2}} = 1.7094 \text{ kA} \quad (9)$$

$$I_{d2} = \frac{0.2940}{1.559 \cdot 0.9924 \sqrt{0.1060^2 + 0.9933^2}} = 1.7121 \text{ kA}$$

$$I_{dmin} = \frac{I_{d1} + I_{d2}}{2}$$

is thus obtained with 1.7107 kA as the smallest possible direct current for meeting all specified network conditions and within the operation range of the converters.

For minimal deviations from the required data of both sides, also other tap ratios such as 34/37, 33/26 or 32/25 can be used, where $I_{dmin}$ has an increasingly larger magnitude. In this connection it must be noted that the current $I_{dmin}$ which increases with decreasing tap combinations must increase only to such an extent that it does not exceed the given nominal value $I_{dn}$ or the control angle $\alpha$, the extinction angle $\gamma$, and the overlap angle u stay within their permissible limits.

For acceptable operation of the d-c-tie, meeting the specified conditions, it must be assumed that $I_{dmin}$ can flow in connection with the permissible tap position, where smaller deviations of the set-point values for the active and reactive power can possibly be corrected by the control or extinction angle.

The control method according to the invention can proceed in an analog as well as a digital manner and allows, as explained, the determination of the optimum operating point for steady-state operating cases as well as of the operating point with the lowest deviation from the desired values for both networks in case of dynamic processes in the networks.

An application of the invention is possible in the manner described in the following not only for two given a-c networks N1 and N2 coupled by the d-c-tie according to FIG. 1, but also for the cooperation of a-c networks of which at least the one a-c network can have different stages of development and the requirement is to be met that the converter transformers, the reactive power control for the d-c-tie and the determined compensation elements are sufficient for all a-c network configurations.

Figure 3:
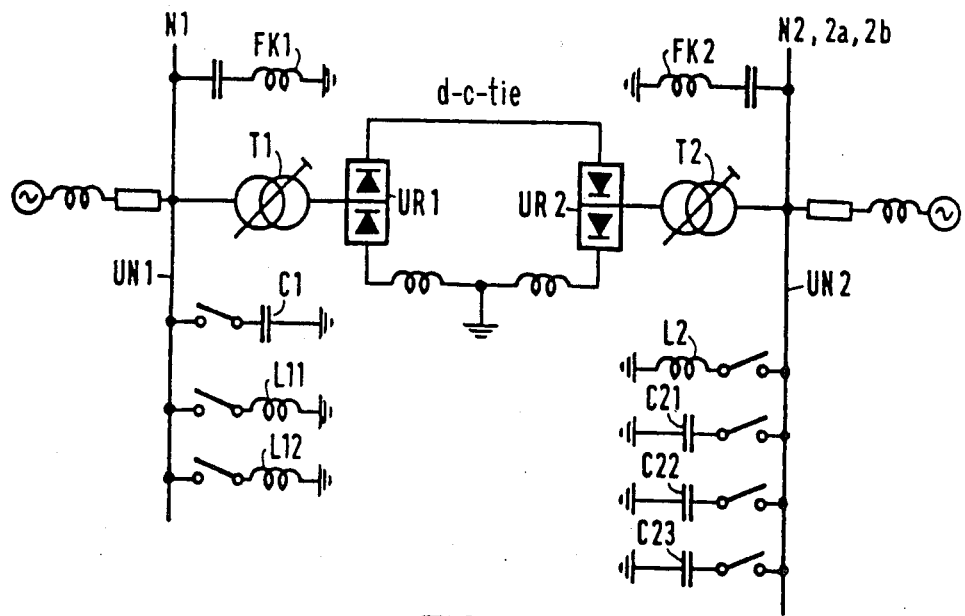
FIG. 3 shows another embodiment of a d-c-tie connecting two a-c networks.

As an example in FIG. 3, the a-c network N1 is to remain unchanged and the a-c network N2 is to be developed in stages to become the network N2a and finally, in a further stage, the network N2b.

Each a-c network is connected according to FIG. 3, similar as in FIG. 1, permanently as a not switchable filter circuit FK1 and FK2 for the elimination of harmonics.

Figure 4:
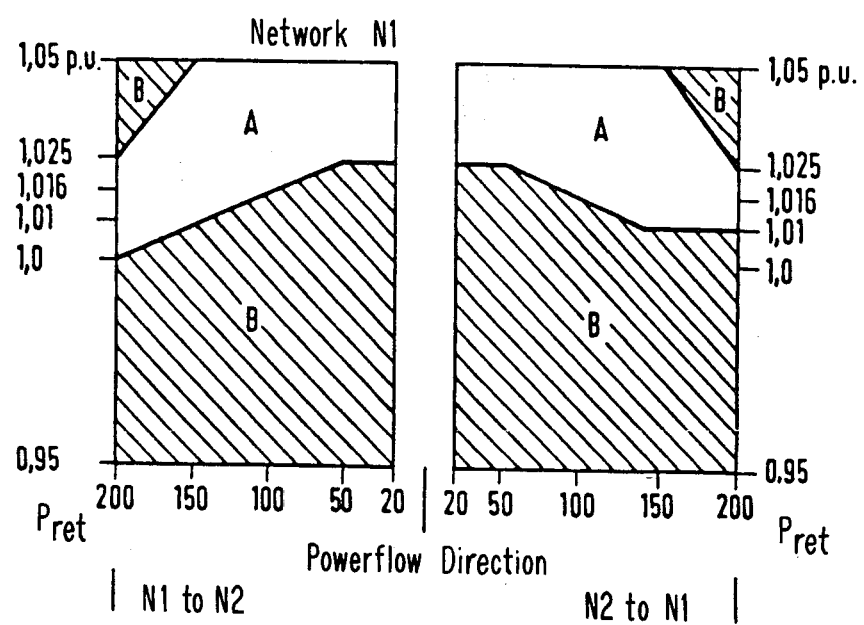
FIG. 4 are graphs explaining the operation of the d-c-tie of FIG. 3 with voltage conditions of the a-c network N1.

By the utility, network voltage limits permitted for each of the a-c networks N1, N2, N2a and N2b for active power $P_{ref}$ and $P_n$ in the two directions of power flow within voltage ranges A for steady-state operation and ranges B permitted only for dynamic processes according to FIG. 4 are set as well as the corresponding reactive powers $Q_N$ according to Tables Ia to IVa. From these Tables Ia to IVa, maximum and minimum inductive and capacitive reactive-power demand of a-c networks are given.

In addition, the average values for inductive or capacitive reactive network power demand can be calculated from the sum of the highest permissible individual active power $P_{ref}$, $P_n$ of the range A, divided by the number of active-power steps per power flow direction and a-c network (noting the minus sign for inductive values) can be summed for the networks N2, N2a, N2b and divided by 3. The respective values for $Q_{NL\ max}$, $Q_{NC\ max}$; $Q_{NL\ mean}$ and $Q_{NC\ mean}$ (for the a-c networks N2, N2a, N2b in common) are entered into the Tables Ia to IVa.

Into the Tables Ib, c to IVb, c, the largest and smallest values of the reactive converter power, $Q_V$ for the different a-c networks and power flow directions in the d-c-tie under favorable and unfavorable a-c network conditions are entered which are calculated in the manner discussed below.

Under favorable a-c network conditions, the minimum values $Q_V$ with the highest permissible network voltage for the respective active power $P_{ref}$, the corresponding reactive a-c network demand $Q_N$ and all inductive compensation elements L are calculated. In this case, the action of the reactors is aided by the respective a-c network.

The maximum values $Q_V$ on the other hand are determined with the smallest permissible network voltage for the respective active power $P_{ref}(P_n)$, the corresponding a-c network reactive-power demand $Q_N$ and all capacitive compensation elements C.

Under unfavorable a-c network conditions, the inner upper limit of $Q_{V\ over}$ of each a-c network with the maximally permissible network voltage is calculated for the corresponding active power $P_{ref}$, the corresponding reactive power demands $Q_N$ and all associated capacitive compensation elements.

The inner lower limit $Q_{V\ under}$ of each a-c network is calculated with the minimally permissible respective network voltage (range A) for the respective active power $P_{ref}$, the corresponding $Q_N$ and all inductive compensation elements provided.

The reactive-power demand $Q_N$ of the a-c network must be covered by the capacitors as well as the filter circuits FK to the extent that $Q_V$ is within the operating range.

For determining the required minimum and maximum transformation ratio ü of the converter transformers T1, T2 and for checking existing converter transformers for applicability (Table XII), use is made of the equations $$U_{max} = \frac{\pi \cdot U_{dn}}{3\sqrt{2}\ U_{Nmin}(\cos\alpha_n - \frac{1}{2} U_{Kn})} \quad (10)$$

as well as $$U_{min} = \frac{\cdot U_{dn}}{3\sqrt{2}\ U_{Nmax}(\cos\gamma_{min} - \frac{1}{2} U_{Kn})} \quad (11)$$

with $U_{Nmin} = U_{Nn} \cdot 0.85$ and $U_{Nmax} = U_{Nn} \cdot 1.05$ (where 0.85 is a value lower than the normal operation data).

The currents on the primary side of the converter transformers are obtained as $$S_{iVmin} = \frac{P_n}{\sqrt{3}\ U_n \cdot \cos\gamma_{min}} \quad (12)$$

$$S_{iVn} = \frac{P_n}{\sqrt{3}\ U_N \cdot \cos\alpha_n} \quad (13)$$

From this, the required reactive converter powers $$Q_{Vmin} = \sqrt{3} \cdot U_{Nn} \cdot S_{iVmin} \cdot \sin\gamma_{min} \quad (14)$$

$$Q_{Vn} = \sqrt{3}\ U_{Nn} \cdot S_{iVn} \cdot \sin\alpha_n \quad (15)$$

and, from the difference $$Q_{Vn} - Q_{Vmin} = \Delta Q_V, \quad (16)$$

the reactive power excursion $\Delta Q_V$ of the converter transformers can be determined.

The reactive power demand of the cooperating two a-c networks must be compensated to the extent that the reactive converter powers for both sides are within the operating range, and therefor their difference is smaller than $\Delta Q_V$. By appropriate combination of the taps of the two converter transformers, a mutual approximation of the reactive converter power can then be accomplished.

The transmission of lowest converter d-c currents $I_d$ and thereby minimizing of the transmission losses of the d-c-tie is achieved if the reactive power of both converters UR1, UR2 are at the lower limit of the respective operating range. So the limits of the operating range are given. The compensation elements are therefor determined as $$Q_{Vn} = \pm \frac{1}{2} \Delta Q_v \quad (17)$$

where $Q_{Vn} = Q_{Vref}$, and form the desired operating range for the converter transformers used and the given voltage ranges A.

For converter transformers with:

| | |
|---|---|
| a nominal short-circuit voltage | $u_{Kn} = 0.17$ |
| nominal converter d-c voltage | $U_{dn} = 24.4$ kV |
| nominal control angle | $\alpha n = 30°$ |

-continued

| | |
|---|---|
| extinction angle one obtains | $\gamma_{min} = 18°$ |
| | $Q_{Vmin} = 65$ MVAr |
| | $Q_{Vn} = 115$ MVAr $= Q_{Vref}$ |
| | $\Delta Q_V = 50$ MVAr | and therefrom the underlimit 90 MVar and the upper limit 740 Mvar of operating range is decided in accordance with $Q_{Vn} \pm \frac{1}{2}\Delta Q_V$.

From a comparison of the values $Q_{NLmax}$ and $Q_{NCmax}$ as well as $Q_{NLmean}$, $Q_{NCmean}$ for the a-c network N1 from Table Ia and corresponding values for the a-c network N2b from Table IVa, with $Q_V$, the following compensation units are available for the networks N1 and N2, N2a, N2b.

For the network N1:

$Q_{NLmax} + Q_{FK} - Q_{Vref} - Q_{indmax} = 69$ (L) MVAr $Q_{NCmax} - Q_{FK} + Q_{Vref} - Q_{capmax} = 69$ (C) MVAr $Q_{NLmean} + Q_{FK} + Q_{Vref} \uparrow Q_{indmean} = 42.6$ (L) MVAr $Q_{NCmean} - Q_{FK} + Q_{Vref} = Q_{capmean} = 37.6$ (C) MVAr For the a-c network N1, $Q_L = 70$ MVAr and $Q_C = 35$ MVAr are sufficient, where $Q_L$ is subdivided into two units of 35 MVAr each so that it is smaller than $\Delta Q_V = 50$ MVAr.

A similar consideration for the a-c networks N2, N2a, N2b yields three capacitors with 35 MVAr each as well as a choke with 35 MVAr, i.e., for both a-c networks N1, N2 (N2a, N2b) applies:

$C_1 = 35$ MVAr, $L_{11}$ and $L_{12}$ are 35 MVAr each;

$C_{21}, C_{22}, C_{23}$ are 35 MVAr and $L_2$ each likewise 35 MVAr.

From the quantities $Q_{FK}, Q_N, Q_L, Q_C$ result the values $Q_V$ contained in Tables Ib, c to IVb, c for the corresponding highest and smallest voltages of the respective ranges A according to the equations:

$$Q_V = Q_{FK} + Q_{NL} + Q_C - Q_L \qquad (18)$$

and $$Q_V = Q_{FK} - Q_{NC} + Q_C - Q_L, \text{ respectively,} \qquad (19)$$

and more specifically referred to the respective p.u. voltages.

The calculated values in Tables Ib, c to IVb, c are presented in Tables V to X in such a way that for the individual a-c networks N1, N2; N2a, N2b, common regions are obtained from which, according to Table XI, common valid operating ranges for all a-c networks are taken which show that a common operating range exists for the d-c-tie determined according to the invention with reactive power control while maintaining a sufficient control reserve in the event of a-c network disturbances, dynamic processes of the a-c network and fast power changes of the generators in the a-c networks (power ramps) is assured with the converter transformers used and the compensation elements selected.

The values contained in the above-mentioned Table XI show that the operating range 90 to 140 MVAr can be started up with the determined compensation elements.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

TABLE I

| RANGE A Voltage in p.u. | | Network N1 | | | | | | | | | | |
|---|---|---|---|---|---|---|---|---|---|---|---|---|
| | | Powerflow direction N1 to N2 P (MW) | | | | | | Powerflow direction N2 to N1 P (MW) | | | | |
| | | 200 | 150 | 100 | 50 | 20 | 0 | 20 | 50 | 100 | 150 | 200 |
| 1,05 | $Q_N$ | B | 59 C | 49 C | 42 C | 37 C | | 34 C | 33 C | 31 C | 29 C | B | (a) |
| 1,025 | $Q_N$ | 1 C | | | 28 L | 31,5 L | | 35 L | 36 L | | | 39 L |
| 1,016 | $Q_N$ | | | 51 L | B | B | | B | B | 66 L | | |
| 1,01 | $Q_N$ | | 53 L | B | B | B | | B | B | B | 79 L | 79 L |
| 1,0 | $Q_N$ | 68 L | B | B | B | B | | B | B | B | B | B |
| | | $Q_{NLmax} = 79$ MVAr | | | | | | $Q_{NLmean} = 52,6$ MVAr | | | | |
| | | $Q_{NCmax} = 59$ MVAr | | | | | | $Q_{NCmean} = 27,6$ MVAr | | | | |
| 1,05 | $Q_V$ | B | 95,4 | 105,4 | 112,4 | 117,4 | | 120,4 | 121,4 | 123,4 | 125,4 | | (b) |
| 1,025 | $Q_V$ | 146,1 | | | 175,1 | 178,6 | | 182,1 | 183,1 | | | 186,1 |
| 1,016 | $Q_V$ | | | 195,5 | B | B | | B | B | 210,5 | | |
| 1,01 | $Q_V$ | | 195,8 | B | B | B | | B | B | B | 221,8 | 221,8 |
| 1,0 | $Q_V$ | 208,0 | B | B | B | B | | B | B | B | B | B |
| 1,05 | $Q_V$ | B | −20,4 | −10,4 | −3,4 | 1,6 | | 4,6 | 5,6 | 7,6 | 9,6 | B | (c) |
| 1,025 | $Q_V$ | 35,8 | | | 64,8 | 68,3 | | 71,8 | 72,8 | | | 75,8 |
| 1,016 | $Q_V$ | | | 87,13 | B | B | | B | B | 102,1 | | |
| 1,01 | $Q_V$ | | 88,7 | B | B | B | | B | B | B | 114,7 | 114,7 |
| 1,0 | $Q_V$ | 103,0 | B | B | B | B | | B | B | B | B | B |

TABLE II

| RANGE A Voltage in p.u. | | Network N2 | | | | | | | | | | |
|---|---|---|---|---|---|---|---|---|---|---|---|---|
| | | Powerflow direction N1 to N2 P (MW) | | | | | | Powerflow direction N2 to N1 P (MW) | | | | |
| | | 200 | 150 | 100 | 50 | 20 | 0 | 20 | 50 | 100 | 150 | 200 |
| 1,05 | $Q_N$ | 51 C | 54 C | 57 C | 65 C | 71 C | | 77 C | 87 C | 100 C | 118 C | B | (a) |
| 1,025 | $Q_N$ | 22 C | 25 C | 27 C | 34 C | 40 C | | 46 C | 55 C | 68 C | 85 C | 103 C |
| 1,0 | $Q_N$ | 7 L | 5 L | 3 L | 4 C | 9 C | | 14 C | 24 C | 36 C | 54 C | 71 C |

TABLE II-continued

| RANGE A Voltage in p.u. | | Network N2 Powerflow direction N1 to N2 P (MW) | | | | | | Powerflow direction N2 to N1 P (MW) | | | | | |
|---|---|---|---|---|---|---|---|---|---|---|---|---|---|
| | | 200 | 150 | 100 | 50 | 20 | 0 | 20 | 50 | 100 | 150 | 200 | |
| | | | | | $Q_{NLmax}$ = 7 MVAr $Q_{NCmax}$ = 118 MVAr | | | | | | | | | |
| 1,05 | $Q_V$ | 180,5 | 177,5 | 174,5 | 166,5 | 160,5 | | 154,5 | 144,5 | 131,5 | 113,5 | B | (b) |
| 1,025 | $Q_V$ | 198,6 | 195,6 | 193,6 | 186,6 | 180,6 | | 174,6 | 165,6 | 152,6 | 135,6 | 117,6 | |
| 1,0 | $Q_V$ | 217,0 | 215,0 | 213,0 | 206,0 | 201,0 | | 196,0 | 186,0 | 174,0 | 156,0 | 139,0 | |
| 1,05 | $Q_V$ | 26,2 | 23,2 | 20,2 | 12,2 | 6,2 | | 0,2 | −9,8 | −22,8 | −40,8 | B | (c) |
| 1,025 | $Q_V$ | 51,5 | 48,5 | 46,5 | 39,5 | 33,5 | | 27,5 | 18,5 | 5,5 | −11,5 | −29,5 | |
| 1,0 | $Q_V$ | 77,0 | 75,0 | 73,0 | 66,0 | 61,0 | | 56,0 | 46,0 | 34,0 | 16,0 | −1,0 | |

TABLE III

| RANGE A Voltage in p.u. | | Network N2a Powerflow direction N1 to N2a P (MW) | | | | | | Powerflow direction N2a to N1 P (MW) | | | | | |
|---|---|---|---|---|---|---|---|---|---|---|---|---|---|
| | | 200 | 150 | 100 | 50 | 20 | 0 | 20 | 50 | 100 | 150 | 200 | |
| 1,05 | $Q_N$ | 9 C | 12 C | 17 C | 24 C | 28 C | | 33 C | 39 C | 50 C | B | B | (a) |
| 1,025 | $Q_N$ | 36 L | 33 L | 28 L | 22 L | 18 L | | 12 L | 6 L | 5 C | 17 C | 30 C | |
| 1,0 | $Q_N$ | 80 L | 77 L | 73 L | 68 L | B | | B | 51 L | 40 L | 28 L | 15 L | |
| | | | | | $Q_{NLmax}$ = 80 MVAr $Q_{NCmax}$ = 50 MVAr | | | | | | | | | |
| 1,05 | $Q_V$ | 222,5 | 219,5 | 214,5 | 207,5 | 203,5 | | 198,5 | 192,5 | 181,5 | B | B | (b) |
| 1,025 | $Q_V$ | 256,6 | 253,6 | 248,6 | 242,6 | 238,6 | | 232,6 | 226,6 | 215,6 | 203,6 | 190,6 | |
| 1,0 | $Q_V$ | 290,0 | 287,0 | 283,0 | 278,0 | B | | B | 261,0 | 250,0 | 238,0 | 225,0 | |
| 1,05 | $Q_V$ | 68,2 | 65,2 | 60,2 | 53,2 | 49,2 | | 44,2 | 38,2 | 27,2 | B | B | (c) |
| 1,025 | $Q_V$ | 109,5 | 106,5 | 101,5 | 95,5 | 91,5 | | 85,5 | 79,5 | 68,5 | 56,5 | 43,5 | |
| 1,0 | $Q_V$ | 150,0 | 147,0 | 143,0 | 138,0 | B | | B | 121,0 | 110,0 | 98,0 | 85,0 | |

TABLE IV

| RANGE A Voltage in p.u. | | Network N2b Powerflow direction N1 to N2b P (MW) | | | | | | Powerflow direction N2b to N1 P (MW) | | | | | |
|---|---|---|---|---|---|---|---|---|---|---|---|---|---|
| | | 200 | 150 | 100 | 50 | 20 | 0 | 20 | 50 | 100 | 150 | 200 | |
| 1,05 | $Q_N$ | 60 C | 63 C | 68 C | 74 C | 80 C | | 84 C | 92 C | 104 C | B | B | (a) |
| 1,025 | $Q_N$ | 12 C | 15 C | 19 C | 25 C | 30 C | | 35 C | 42 C | 54 C | 67 C | 81 C | |
| 1,0 | $Q_N$ | 36 L | 33 L | 30 L | 25 L | B | | B | 8 L | 3 C | 15 C | 29 C | |
| | | $Q_{NLmax}$ = 36 MVAr $Q_{NCmax}$ = 104 MVAr | | | $Q_{NLmean}$ = 9,5 MVAr $Q_{NCmean}$ = 60,5 MVAr | | | for all Networks N2, N2a, N2b together | | | | | |
| 1,05 | $Q_V$ | 171,5 | 168,5 | 163,5 | 157,5 | 151,5 | | 147,5 | 139,5 | 127,5 | B | B | (b) |
| 1,025 | $Q_V$ | 208,6 | 205,6 | 201,6 | 195,6 | 190,6 | | 185,6 | 178,6 | 166,6 | 153,6 | 139,6 | |
| 1,0 | $Q_V$ | 246,0 | 243,0 | 240,0 | 235,0 | B | | B | 218,0 | 207,0 | 195,0 | 181,0 | |
| 1,05 | $Q_V$ | 17,2 | 14,2 | 9,2 | 3,2 | −2,8 | | −6,8 | −14,8 | −26,8 | B | B | (c) |
| 1,025 | $Q_V$ | 61,5 | 58,5 | 54,5 | 48,5 | 43,5 | | 38,5 | 31,5 | 19,5 | 6,5 | −7,5 | |
| 1,0 | $Q_V$ | 106,0 | 103,0 | 100,0 | 95,0 | B | | B | 78,0 | 67,0 | 55,0 | 41,0 | |

TABLE V

| | | Powerflow direction N1 to N2 | | Common region under | |
|---|---|---|---|---|---|
| | | N1 | N2 | unfavorable Network conditions | favorable Network conditions |
| 200 MW $P_n$ | $Q_{Vmax}$ | 208,0 | 217,0 | 103,0–146,1 | 35,8–208,0 |
| | $Q_{Vover}$ | 146,1 | 180,5 | | |
| | $Q_{Vunder}$ | 103,0 | 77,0 | | |
| | $Q_{Vmin}$ | 35,8 | 26,2 | | |
| 150 MW $P_{Ref}$ | $Q_{Vmax}$ | 195,8 | 215,0 | 88,7–95,4 | 23,2–195,8 |
| | $Q_{Vover}$ | 95,4 | 177,5 | | |
| | $Q_{Vunder}$ | 88,7 | 75,0 | | |
| | $Q_{Vmin}$ | −20,4 | 23,2 | | |
| 100 MW $P_{Ref}$ | $Q_{Vmax}$ | 195,5 | 213,0 | 87,1–105,4 | 20,2–195,5 |
| | $Q_{Vover}$ | 105,4 | 174,5 | | |
| | $Q_{Vunder}$ | 87,1 | 73,0 | | |
| | $Q_{min}$ | −10,4 | 20,2 | | |
| 50 MW $P_{Ref}$ | $Q_{Vmax}$ | 175,1 | 206,0 | 66,0–112,4 | 12,2–175,1 |
| | $Q_{Vover}$ | 112,4 | 166,5 | | |
| | $Q_{Vunder}$ | 64,8 | 66,0 | | |
| | $Q_{Vmin}$ | −3,4 | 12,2 | | |

TABLE V-continued

| | | Powerflow direction N1 to N2 | | Common region under | |
|---|---|---|---|---|---|
| | | N1 | N2 | unfavorable Network conditions | favorable Network conditions |
| 20 MW $P_{Ref}$ | $Q_{Vmax}$ | 178,6 | 201,0 | 68,3–117,4 | 6,2–178,6 |
| | $Q_{Vover}$ | 117,4 | 160,5 | | |
| | $Q_{Vunder}$ | 68,3 | 61,0 | | |
| | $Q_{Vmin}$ | 1,6 | 6,2 | | |

TABLE VI

| | | Powerflow direction N2 to N1 | | Common region under | |
|---|---|---|---|---|---|
| | | N1 | N2 | unfavorable Network conditions | favorable Network conditions |
| 200 MW $P_n$ | $Q_{Vmax}$ | 221,8 | 139,0 | 114,7–117,6 | 75,8–139,0 |
| | $Q_{Vover}$ | 186,1 | 117,6 | | |

TABLE VI-continued

Powerflow direction N2 to N1

| | | N1 | N2 | Common region under unfavorable Network conditions | favorable Network conditions |
|---|---|---|---|---|---|
| | $Q_{Vunder}$ | 114,7 | −1,0 | | |
| | $Q_{Vmin}$ | 75,8 | −29,5 | | |
| 150 MW $P_{Ref}$ | $Q_{Vmax}$ | 221,8 | 156,0 | 113,5–114,7 | 9,6–156,0 |
| | $Q_{Vover}$ | 125,4 | 113,5 | | |
| | $Q_{Vunder}$ | 114,7 | 16,0 | | |
| | $Q_{Vmin}$ | −9,6 | −40,8 | | |
| 100 MW $P_{Ref}$ | $Q_{Vmax}$ | 210,5 | 174,0 | 102,1–123,4 | 7,6–174,0 |
| | $Q_{Vover}$ | 123,4 | 131,5 | | |
| | $Q_{Vunder}$ | 102,1 | 34,0 | | |
| | $Q_{min}$ | 7,6 | −22,8 | | |
| 50 MW $P_{Ref}$ | $Q_{Vmax}$ | 183,1 | 186,0 | 72,8–121,4 | 5,6–183,1 |
| | $Q_{Vover}$ | 121,4 | 144,5 | | |
| | $Q_{Vunder}$ | 72,8 | 46,0 | | |
| | $Q_{Vmin}$ | 5,6 | −9,8 | | |
| 20 MW $P_{Ref}$ | $Q_{Vmax}$ | 182,1 | 196,0 | 71,8–120,4 | 4,6–182,1 |
| | $Q_{Vover}$ | 120,4 | 154,5 | | |
| | $Q_{Vunder}$ | 71,8 | 56,0 | | |
| | $Q_{Vmin}$ | 4,6 | 0,2 | | |

TABLE VII

Powerflow direction N1 to N2a

| | | N1 | N2a | Common region under unfavorable Network conditions | favorable Network conditions |
|---|---|---|---|---|---|
| 200 MW $P_n$ | $Q_{Vmax}$ | 208,0 | 290,0 | 146,1–150,0 | 68,2–208,0 |
| | $Q_{Vover}$ | 146,1 | 222,5 | | |
| | $Q_{Vunder}$ | 103,0 | 150,0 | | |
| | $Q_{Vmin}$ | 35,8 | 68,2 | | |
| 150 MW $P_{Ref}$ | $Q_{Vmax}$ | 195,8 | 287,0 | 95,4–147,0 | 65,2–195,8 |
| | $Q_{Vover}$ | 95,4 | 219,5 | | |
| | $Q_{Vunder}$ | 88,7 | 147,0 | | |
| | $Q_{Vmin}$ | −20,4 | 65,2 | | |
| 100 MW $P_{Ref}$ | $Q_{Vmax}$ | 195,5 | 283,0 | 105,4–143,0 | 60,2–195,5 |
| | $Q_{Vover}$ | 105,4 | 214,7 | | |
| | $Q_{Vunder}$ | 87,1 | 143,0 | | |
| | $Q_{min}$ | −10,4 | 60,2 | | |
| 50 MW $P_{Ref}$ | $Q_{Vmax}$ | 175,1 | 278,0 | 112,4–138,0 | 53,2–175,1 |
| | $Q_{Vover}$ | 112,4 | 207,5 | | |
| | $Q_{Vunder}$ | 64,8 | 138,0 | | |
| | $Q_{Vmin}$ | −3,4 | 53,2 | | |
| 20 MW $P_{Ref}$ | $Q_{Vmax}$ | 178,6 | 238,6 | 91,5–117,4 | 49,2–178,6 |
| | $Q_{Vover}$ | 117,4 | 203,5 | | |
| | $Q_{Vunder}$ | 68,3 | 91,5 | | |
| | $Q_{Vmin}$ | 1,6 | 49,2 | | |

TABLE VIII

Powerflow direction N2a to N1

| | | N1 | N2a | Common Region under unfavorable Network conditions | favorable Network conditions |
|---|---|---|---|---|---|
| 200 MW $P_n$ | $Q_{Vmax}$ | 221,8 | 225,0 | 114,7–186,1 | 75,8–221,8 |
| | $Q_{Vover}$ | 186,1 | 190,6 | | |
| | $Q_{Vunder}$ | 114,7 | 85,0 | | |
| | $Q_{Vmin}$ | 75,8 | 43,5 | | |
| 150 MW $P_{Ref}$ | $Q_{Vmax}$ | 221,8 | 238,0 | 114,7–125,4 | 56,5–221,8 |
| | $Q_{Vover}$ | 125,4 | 203,6 | | |
| | $Q_{Vunder}$ | 114,7 | 98,0 | | |
| | $Q_{Vmin}$ | 9,6 | 56,5 | | |
| 100 MW $P_{Ref}$ | $Q_{Vmax}$ | 210,5 | 250,0 | 110,0–123,4 | 27,2–210,5 |
| | $Q_{Vover}$ | 123,4 | 181,5 | | |
| | $Q_{Vunder}$ | 102,1 | 110,0 | | |
| | $Q_{min}$ | 7,6 | 27,2 | | |
| 50 MW $P_{Ref}$ | $Q_{Vmax}$ | 183,1 | 261,0 | 121,0–121,4 | 38,2–183,1 |
| | $Q_{Vover}$ | 121,4 | 192,5 | | |
| | $Q_{Vunder}$ | 72,8 | 121,0 | | |
| | $Q_{Vmin}$ | 5,6 | 38,2 | | |
| 20 MW $P_{Ref}$ | $Q_{Vmax}$ | 182,1 | 232,6 | 85,5–120,4 | 44,2–182,1 |
| | $Q_{Vover}$ | 120,4 | 198,5 | | |
| | $Q_{Vunder}$ | 71,8 | 85,5 | | |
| | $Q_{Vmin}$ | 4,6 | 44,2 | | |

TABLE IX

Powerflow direction N1 to N2b

| | | N1 | N2b | Common Region under unfavorable Network conditions | favorable Network conditions |
|---|---|---|---|---|---|
| 200 MW $P_n$ | $Q_{Vmax}$ | 208,0 | 246,0 | 106,0–146,1 | 35,8–208,0 |
| | $Q_{Vover}$ | 146,1 | 171,5 | | |
| | $Q_{Vunder}$ | 103,0 | 106,0 | | |
| | $Q_{Vmin}$ | 35,8 | 17,2 | | |
| 150 MW $P_{Ref}$ | $Q_{Vmax}$ | 195,8 | 243,0 | 95,4–103,0 | 14,2–195,8 |
| | $Q_{Vover}$ | 95,4 | 168,5 | | |
| | $Q_{Vunder}$ | 88,7 | 103,0 | | |
| | $Q_{Vmin}$ | −20,4 | 14,2 | | |
| 100 MW $P_{Ref}$ | $Q_{Vmax}$ | 195,5 | 240,0 | 100,0–105,4 | 9,2–195,5 |
| | $Q_{Vover}$ | 105,4 | 163,5 | | |
| | $Q_{Vunder}$ | 87,1 | 100,0 | | |
| | $Q_{min}$ | −10,4 | 9,2 | | |
| 50 MW $P_{Ref}$ | $Q_{Vmax}$ | 175,1 | 235,0 | 95,0–112,4 | 3,2–175,1 |
| | $Q_{Vover}$ | 112,4 | 157,5 | | |
| | $Q_{Vunder}$ | 64,8 | 95,0 | | |
| | $Q_{Vmin}$ | −3,4 | 3,2 | | |
| 20 MW $P_{Ref}$ | $Q_{Vmax}$ | 178,6 | 190,6 | 68,3–117,4 | 1,6–178,6 |
| | $Q_{Vover}$ | 117,4 | 151,5 | | |
| | $Q_{Vunder}$ | 68,3 | 43,5 | | |
| | $Q_{Vmin}$ | 1,6 | −2,8 | | |

TABLE X

Powerflow direction N2b to N1

| | | N1 | N2b | Common Region under unfavorable Network conditions | favorable Network conditions |
|---|---|---|---|---|---|
| 200 MW $P_n$ | $Q_{Vmax}$ | 221,8 | 181,0 | 114,7–139,6 | 75,8–181,0 |
| | $Q_{Vover}$ | 186,1 | 139,6 | | |
| | $Q_{Vunder}$ | 114,7 | 41,0 | | |
| | $Q_{Vmin}$ | 75,8 | −7,5 | | |
| 150 MW $P_{Ref}$ | $Q_{Vmax}$ | 221,8 | 195,0 | 114,7–125,4 | 9,6–195,0 |
| | $Q_{Vover}$ | 125,4 | 153,6 | | |
| | $Q_{Vunder}$ | 114,7 | 55,0 | | |
| | $Q_{Vmin}$ | 9,6 | 6,5 | | |
| 100 MW $P_{Ref}$ | $Q_{Vmax}$ | 210,5 | 207,0 | 102,1–123,4 | 7,6–207,0 |
| | $Q_{Vover}$ | 123,4 | 127,5 | | |
| | $Q_{Vunder}$ | 102,1 | 67,0 | | |
| | $Q_{Vmin}$ | 7,6 | −26,8 | | |
| 50 MW $P_{Ref}$ | $Q_{Vmax}$ | 183,1 | 218,0 | 78,0–121,4 | 5,6–218,0 |
| | $Q_{Vover}$ | 121,4 | 139,5 | | |
| | $Q_{Vunder}$ | 72,8 | 78,0 | | |
| | $Q_{Vmin}$ | 5,6 | −14,8 | | |
| 20 MW $P_{Ref}$ | $Q_{Vmax}$ | 182,1 | 185,6 | 71,8–120,4 | 4,6–182,1 |
| | $Q_{Vover}$ | 120,4 | 147,5 | | |
| | $Q_{Vunder}$ | 71,8 | 38,5 | | |
| | $Q_{Vmin}$ | 4,6 | −6,8 | | |

TABLE XI

Largest common operating region of the reactive converter power of all a-c-networks

| | | under favorable Network conditions | | under unfavorable Network conditions | |
|---|---|---|---|---|---|
| P = | 200 MW | 75,8 to | 139,0 MVAr | 103,0 to | 139,0 MVAr |
| | 150 MW | 65,2 | 156,0 MVAr | 88,7 | 147,0 MVAr |
| | 100 MW | 60,2 | 174,0 MVAr | 87,1 | 143,0 MVAr |
| | 50 MW | 53,2 | 175,1 MVAr | 66,0 | 138,0 MVAr |

TABLE XI-continued

Largest common operating region of the reactive converter power of all a-c-networks

| | under favorable Network conditions | | under unfavorable Network conditions | |
|---|---|---|---|---|
| 20 MW | 49,2 | 178,6 MVAr | 68,3 | 120,4 MVAr |

TABLE XII

Data of the converter transformers of the d-c-tie

| Voltage limits for the bus bar voltage | | max. permissible tap | Short circuit voltage $U_{Kn}$ | transformation ratio | |
|---|---|---|---|---|---|
| smaller to | 209,29 kV | 35 | 0,1530 | 0,110449 | $u_{max}$ |
| 209,3 | 213,89 | 34 | 0,1550 | 0,108696 | |
| 213,9 | 216,19 | 33 | 0,1560 | 0,106997 | |
| 216,2 | 220,79 | 32 | 0,1580 | 0,105351 | |
| 220,8 | 223,09 | 31 | 0,1590 | 0,103755 | |
| 223,1 | 227,69 | 30 | 0,1600 | 0,102206 | |
| 227,7 | 229,99 | 29 | 0,1610 | 0,100703 | |
| 230,0 | 234,59 | 28 | 0,1620 | 0,099244 | |
| 234,6 | 236,89 | 27 | 0,1630 | 0,097826 | |
| 236,9 | 241,49 | 26 | 0,1650 | 0,096448 | |
| 241,5 | 243,79 | 25 | 0,1660 | 0,095109 | |
| 243,8 | 248,39 | 24 | 0,1670 | 0,093806 | |
| 248,4 | 250,69 | 23 | 0,1690 | 0,092538 | |
| 250,7 | greater | 22 | 0,1700 | 0,091304 | nominal value |
| | | 21 | 0,1720 | 0,090103 | |
| | | 20 | 0,1730 | 0,088933 | |
| | | 19 | 0,1740 | 0,087793 | |
| | | 18 | 0,1720 | 0,086681 | |
| | | 17 | 0,1730 | 0,085598 | |
| | | 16 | 0,1740 | 0,08541 | |
| | | 15 | 0,1760 | 0,083510 | |
| | | 14 | 0,1770 | 0,082504 | $u_{min}$ |
| | | 13 | 0,1780 | 0,081522 | |
| | | 12 | 0,1790 | 0,080563 | |
| | | 11 | 0,1800 | 0,796626 | |
| | | 10 | 0,1810 | 0,078711 | |
| | | 9 | 0,1830 | 0,077816 | |
| | | 8 | 0,1840 | 0,076942 | |
| | | 7 | 0,1850 | 0,076087 | |
| | | 6 | 0,1860 | 0,075251 | |
| | | 5 | 0,1870 | 0,074433 | |
| | | 4 | 0,1880 | 0,073633 | |
| | | 3 | 0,1900 | 0,072849 | |
| | | 2 | 0,1910 | 0,072082 | |
| | | 1 | 0,1920 | 0,071332 | |

We claim:

1. A combined power and a-c voltage control method for a d-c high-voltage transmission system (d-c-tie) connecting two three-phase a-c networks by a connecting point with influencing of the reactive-power of both a-c networks by at least one of a shunt reactor and a capacitor and further having a converter and a converter transformer for each network, the converter transformer being switchable by a tap changer for maintaining a voltage of the a-c networks on the connecting point of the d-c-tie, the method comprising the steps of switching tap positions of both converter transformers to perform simultaneous active and reactive power control of both a-c networks by combinations of selected ones of fixed and switchable shunt capacitors and shunt reactors comprising compensation means, further including setting the tap changer of both converter transformers to obtain an optimum operating point for the converters of the d-c-tie at a maximally permissible tap position for the respective operating voltage of one converter transformer, the converter transformers each having a primary connected to the network and a secondary connected to the d-c tie and wherein a ratio of the primary currents of the two converter transformers and a transformation ratio of the maximally permissible tap position of the one converter transformer to a tap position of the other converter transformer is chosen in accordance with the relationship $$\frac{u_2}{u_1} = \frac{S_{iV2}}{S_{iV1}} \cdot \sqrt{\frac{\rho_1^2 + \epsilon_1^2}{\rho_2^2 + \epsilon_2^2}}$$

taking into consideration a relationship defining a prevailing d-c current in the d-c tie $$I_d = \frac{S_{IV}}{\frac{3b}{\pi} \sqrt{\frac{2}{3}} \, u \cdot \sqrt{\rho^2 + \epsilon^2}}$$

to obtain a permissible d-c current $I_{dmin}$ for the d-c-tie meeting all a-c network requirements, equal to one-half of the sum of the theoretical d-c currents of both converters, wherein $ü_1$, $ü_2$ are the converter transformer transformation ratios; $S_{iV1}$, $S_{iV2}$ are the primary currents of the converter transformers; b is a number of the series-connected converter bridges in the converters; $\rho_1, \rho_2, \chi_2, \chi_1$ are variables dependent on control angles $\alpha$, extinction angles $\gamma$, and overlap angles u in accordance with the following equations:

$$\epsilon = \tfrac{1}{2}[\cos\alpha - \cos(\alpha + u)]$$

$$\rho = \tfrac{1}{2}[\cos\alpha + \cos(\alpha + u)]$$

$$= \tfrac{1}{2}[\sin\alpha + \sin(\alpha + u)] + \frac{u\frac{\pi}{180} - \sin u}{4\epsilon}.$$

2. The control method recited in claim 1, wherein the optimum operating points for the converters of the d-c-tie connected to both a-c networks are located within a region which is determined by the number of shunt reactors or capacitors provided, and the size of the respective converter transformers, the number and magnitude of the tap changer positions and the voltage-dependent reactive-power demands of the a-c networks.

3. The control method recited in claim 1, wherein, for supporting one a-c network, the d-c current determined for the converter connected to said one a-c network is set as a transmission current.

4. The control method recited in claim 1, wherein maximum and minimum transformation ratios $ü_{max}$, $ü_{min}$ of the converter transformers are designed as a function of a nominal d-c voltage $U_{dn}$ of the converters, a network voltage $U_N$, a nominal transformer short circuit voltage $u_{Kn}$, a nominal control angle $\alpha_n$ and an extinction angle $\gamma$ min responsible for the power flow in both directions according to the relations:

$$U_{max} = \frac{\pi \cdot U_{dn}}{3\sqrt{2} \cdot U_{Nmin} (\cos\alpha_n - \tfrac{1}{2}u_{Kn})}$$

$$U_{min} = \frac{\pi \cdot U_{dn}}{3\sqrt{2} \cdot U_{Nmax} (\cos\alpha_{min} - \tfrac{1}{2}u_{Kn})}$$

5. The control method recited in claim 2, wherein from reactive powers $Q_{Vn}$ equal to $Q_{Vref}$ at a nominal control angle $\alpha_n$ and $Q_{Vmin}$ with an extinction angle $\gamma_{min}$, the lower and upper limits of the operating range with the compensation means are determined by $Q_{ref} = \pm \frac{1}{2} \Delta Q_V$, where $\Delta Q_V$ is the difference between $Q_{Vn}$ and $Q_{Vmin}$, and wherein the converter transformers approach the operating point with minimum losses therefor and sufficient control reserves, maintaining the requirements set by a utility.

* * * * *